May 9, 1933.    R. G. URCH    1,908,086
METHOD OF MAKING A UNIVERSAL JOINT
Filed Dec. 10, 1927    2 Sheets-Sheet 1
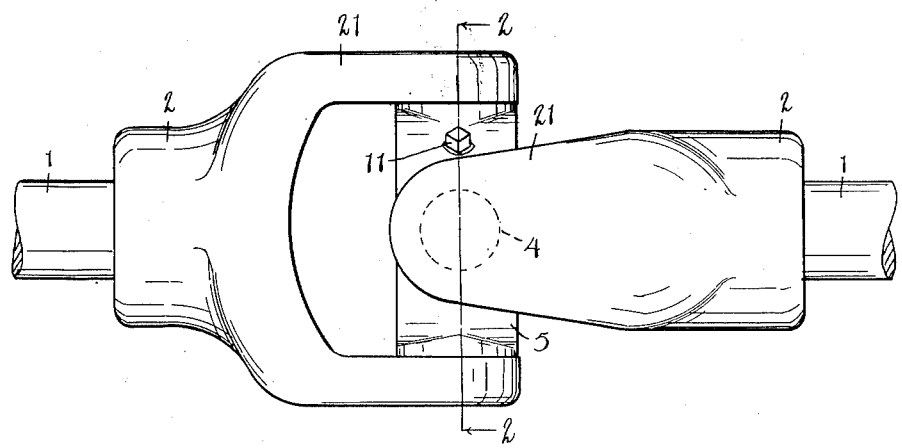
Fig. 1
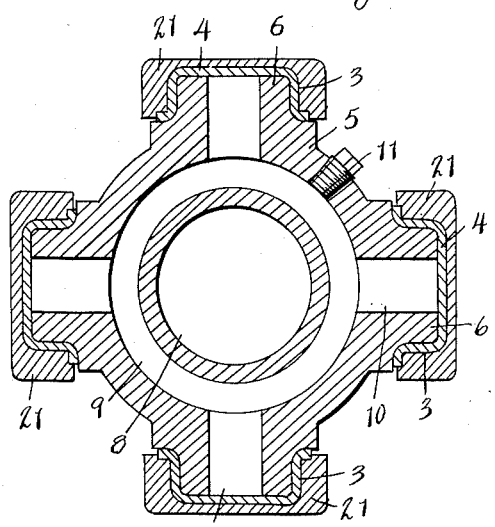
Fig. 2
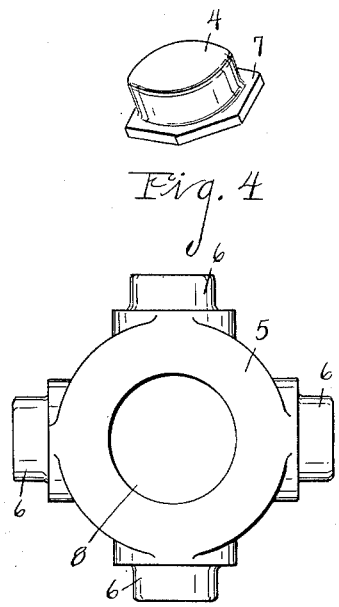
Fig. 4
Fig. 3
INVENTOR
Raymond G. Urch
BY Chappell & Earl
ATTORNEYS May 9, 1933. R. G. URCH 1,908,086

METHOD OF MAKING A UNIVERSAL JOINT

Filed Dec. 10, 1927 2 Sheets-Sheet 2

INVENTOR
Raymond G. Urch
BY Chappell & Earl
ATTORNEYS

Patented May 9, 1933

1,908,086

UNITED STATES PATENT OFFICE

RAYMOND G. URCH, OF ALLEGAN, MICHIGAN, ASSIGNOR TO LEONARD H. MATTINGLY, OF ALLEGAN, MICHIGAN

METHOD OF MAKING A UNIVERSAL JOINT

Application filed December 10, 1927. Serial No. 239,079.

The main objects of this invention are:

First, to provide an improved universal joint which is formed by casting operations and assembled during such casting operations.

Second, to provide an improved universal joint having these advantages which is very economical in structure and at the same time strong and durable and suitable for use in various relations.

Objects relating to details and economies of my invention will appear from the detailed description to follow. The invention is defined and pointed out in the claim.

A structure which is a preferred embodiment of my invention is illustrated in the accompanying drawings, forming a part of this application, in which:

Fig. 1 is a side elevation of a universal joint embodying the features of my invention, the shafts being broken away.

Fig. 2 is a transverse section on line 2—2 of Fig. 1.

Fig. 3 is an end view of the coupling member separated from the shaft members.

Fig. 4 is a perspective view of one of the bearing bushings.

In the drawings similar reference characters refer to similar parts throughout the several views.

Figure 5:
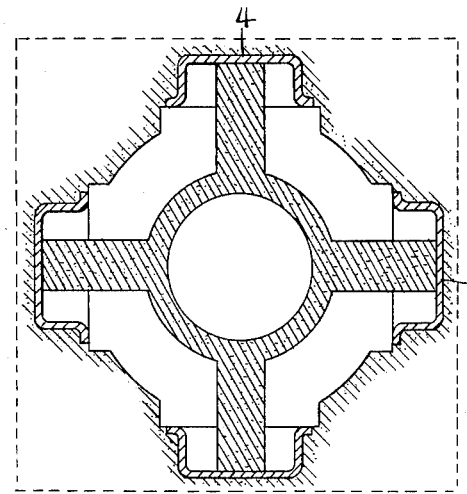
Fig. 5 is a fragmentary section of a mold adapted to receive the molten metal for forming the coupling member, the cap-like bushings being shown in place facing inwardly at the ends of the mold arms.
Figure 6:
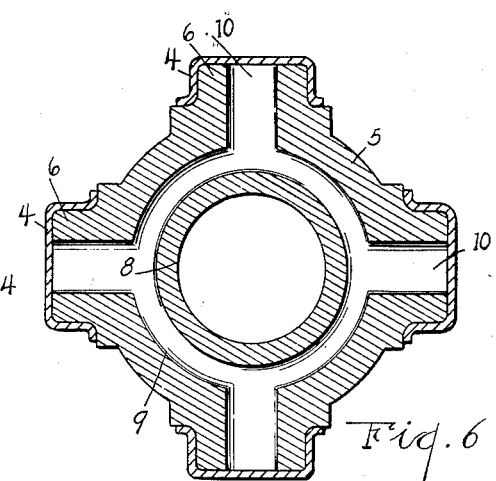
Fig. 6 is a section of the completed coupling member after the removal of the core and with the cap-like bushings in place.
Figure 7:
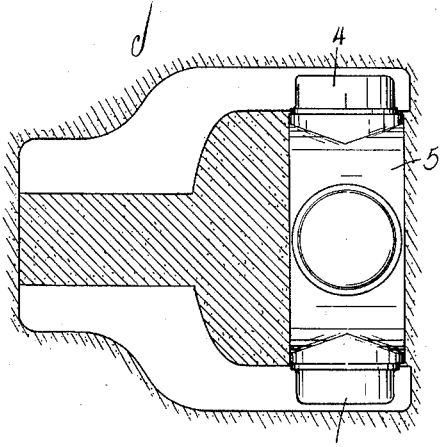
Fig. 7 is a section of the second mold adapted to receive molten metal for forming one of the forked shaft members with the coupling member as a core.
Figure 8:
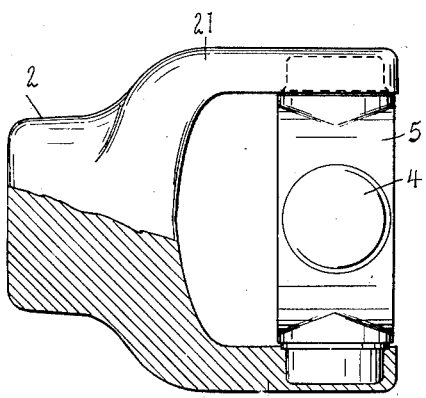
Fig. 8 is a view partially in elevation and partially in section of the product after the second molding operation.

Referring to the drawings, 1, 1 represent the shaft sections to be coupled.

My improved universal joint comprises a pair of forked shaft members 2, these shaft members being duplicates, the arms 21 of each being provided with opposed inwardly facing bearings 3. These bearings are preferably provided with cup-like bushings 4.

The coupling member 5 is of general cruciform shape, its arms terminating in journals 6 coacting with the bushings 4. The bushings have flanges 7, preferably polygonal or non-circular, as illustrated.

The coupling member has a central opening 8 therein which is of such dimension as to permit machining of the shaft members to adapt them to the shaft coupled through the opening and after the shaft members are assembled with the coupling member. One of the shaft members may be swung out of the way while the other is being machined, or both may be machined in line, the tool passing entirely through the joint.

The coupling member is cored to provide an annular lubricant reservoir 9. The arms of the coupling member have passages 10 opening at the ends thereof and communicating with this lubricant reservoir. A filling opening is provided having a closure plug 11.

The shaft members are an integral casting while the coupling member is another integral casting, thus obviating the necessity for separate journal pins.

In forming the joint, the shaft members 2 and the coupling member 5 are, as stated, formed as castings, the coupling member being preferably formed or cast first, with the cap-like bushings 4 arranged in the mold so that the journals are cast therein, the bushings having the effect of chills for the journals. It will be understood that the shrinkage of the casting tends to provide clearance for the journals in the bushings. The shaft members are then molded or cast with the member 5 arranged in the mold so that the arms of the shaft members are cast upon the cap-like bushings. The shrinkage of the metal in this intance tends to clamp the bushings so that they are firmly united to the shaft members. The form of the flange further holds them against rotation.

It is found that in practice the journals readily free themselves from the bushings and an effective bearing relation is provided.

During the casting of the shaft members, the cap-like bushings constitute closures for the ends of the passages 10.

My improved couplings are very economical to produce. The joint is strong and is adapted for use in a great variety of relations where economy is a feature and especially where great accuracy in the bearings is not an essential.

Having thus described my invention, what I claim as new and desire to secure by Letters Patent, is:

The method of making universal joints, which comprises preparing a mold for a cruciform coupling member, disposing cap-like bushings facing inwardly at the ends of the mold arms, pouring molten metal into the mold, preparing a second mold for the forked shaft members with the coupling member as a core, and pouring molten metal into the second mold.

In witness whereof I have hereunto set my hand.

RAYMOND G. URCH.